US008836975B2

(12) United States Patent
Kitada (10) Patent No.: US 8,836,975 B2
(45) Date of Patent: Sep. 16, 2014

(54) PRINTER WITH A WEB BROWSER FOR OBTAINING HTML DATA FROM A SERVER

(75) Inventor: Naruhide Kitada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 13/253,568

(22) Filed: Oct. 5, 2011

(65) Prior Publication Data

US 2012/0081749 A1 Apr. 5, 2012

(30) Foreign Application Priority Data

Oct. 5, 2010 (JP) ................................. 2010-225658

(51) Int. Cl.
*G06F 3/12* (2006.01)
*H04L 29/08* (2006.01)

(52) U.S. Cl.
CPC .............. *G06F 3/121* (2013.01); *G06F 3/1271* (2013.01); *G06F 3/1259* (2013.01); *H04L 67/02* (2013.01); *G06F 3/1287* (2013.01); *G06F 3/122* (2013.01); *G06F 3/1234* (2013.01); *G06F 3/1246* (2013.01)
USPC .......... 358/1.15; 358/1.14; 709/217; 709/219

(58) Field of Classification Search
USPC ....................................................... 358/1.15
See application file for complete search history.

(56) References Cited

U.S. PATENT DOCUMENTS

| 7,921,175 | B2 * | 4/2011 | Noguchi ........................ 709/207 |
| 2002/0066989 | A1 * | 6/2002 | Simpson ..................... 270/52.01 |
| 2003/0140136 | A1 | 7/2003 | Nakamura | |
| 2005/0133585 | A1 | 6/2005 | Nakamura | |
| 2006/0077428 | A1 * | 4/2006 | Lovat et al. .................. 358/1.15 |
| 2006/0085498 | A1 | 4/2006 | Matsushima | |
| 2007/0229885 | A1 * | 10/2007 | Kimura ......................... 358/1.15 |
| 2009/0244620 | A1 * | 10/2009 | Takahashi et al. ........... 358/1.15 |
| 2010/0238502 | A1 * | 9/2010 | Oshima et al. ............... 358/1.15 |
| 2010/0290086 | A1 * | 11/2010 | Funahashi ..................... 358/1.15 |
| 2011/0080612 | A1 * | 4/2011 | Park et al. ..................... 358/1.15 |
| 2011/0205593 | A1 * | 8/2011 | Moroi .......................... 358/1.15 |

FOREIGN PATENT DOCUMENTS

| JP | 11-113072 | A | 4/1999 |
| JP | 2000-138788 | A | 5/2000 |
| JP | 2002-086847 | A | 3/2002 |
| JP | 2003-108354 | A | 4/2003 |
| JP | 2004-005002 | A | 1/2004 |
| JP | 2004-234206 | A | 8/2004 |
| JP | 2004-272468 | A | 9/2004 |
| JP | 2005-259106 | A | 9/2005 |
| JP | 2006-134043 | A | 5/2006 |
| JP | 2007-160851 | A | 6/2007 |
| JP | 2010-231314 | A | 10/2010 |

\* cited by examiner

*Primary Examiner* — Benjamin O Dulaney
(74) *Attorney, Agent, or Firm* — Nutter McClennen & Fish LLP; John J. Penny, Jr.; Michael P. Visconti, III (57) ABSTRACT

A network system has a printer with an internal web browser connected to a web server. The printer has a request unit that sends an HTTP request with printer status information embedded in the URL to the server, a data acquisition unit that gets HTML data from the server, and a print unit that executes a printing process based on the supplied HTML data. The server includes a request receiving unit that receives HTTP requests from the printer, a data transmission unit that sends HTML data to the client, and a status management unit that manages the printer status based on the status information embedded in the URL of the HTTP request.

14 Claims, 11 Drawing Sheets

```
result=printer_check();
result2=display_check();
If(result==OK && result2==FAILED)
        {Print_out("format_support",xxxxxxxx);}
```

```
<html>

PRINTING TICKET A

<script>
job=get_data(format_a)
print(job)
</script>
</html>
```

```
<html>

PRINTING TICKET A

<script>
ticket A
mmmmmmmmm
mmmmmmmmm
mmmmmmmmm
mmmmmmmmm
mmmmmmmmm
mmmmmmmmm
</script>
</html>
```

PRINTER WITH A WEB BROWSER FOR OBTAINING HTML DATA FROM A SERVER

Priority is claimed under 35 U.S.C. §119 from Japanese patent application no. JP 2010-225658 filed on Oct. 5, 2010, which is hereby incorporated by reference in their entirety.

BACKGROUND

1. Technical Field

The present invention relates to a network system in which a client with a web browser and a web server are connected over a network, and to the client and a method of controlling the client.

2. Related Art

Japanese Unexamined Patent Appl. Pub. JP-A-2004-272468 teaches a network system that enables printing labels without downloading an application to a client by installing an application for printing labels on a web server, and installing a web browser and a web printing tool on the client. This type of network system requires the web server to know the status of the client. More particularly with the network system taught in JP-A-2004-272468, the web server must know the printing status of the label printer connected to the client. This can be done by installing a special program on the client and regularly reporting the client status to the web server (first method). Another known method is for the web server to access the client to get the client status, and acquire the response to this access attempt as the client status.

However, this first method, which requires installing a special program on the client, also requires using a special server as the web server. The second method, which requires the web server to access the client to acquire the client status, can only be used in specific environments because the web server cannot access the client through a firewall, and therefore cannot be used in environments that use a typical home router, for example.

Both of these methods thus require a special server or environment in order for the web server to manage the client status, and building the network system is therefore expensive.

Managing client status with a web server also necessarily increases client-server communication. Because the processing load of the web server therefore increases, a high performance web server is needed, a web server specifically for managing client status information is required, and the overall cost of the service increases.

SUMMARY

A network system, a status management method for a network system, and a program according to the invention enable managing client status by means of a web server at a low cost.

A first aspect of the invention is a network system having a web server and a client with an internal web browser connected over a network, wherein: the client includes a request unit that sends an HTTP request for acquiring data to the server, a data acquisition unit that gets HTML data supplied from the server in response to the HTTP request, and a process execution unit that executes a process based on the supplied HTML data; and the server includes a request receiving unit that receives the HTTP request from the client, a data transmission unit that sends the HTML data to the client, and a status management unit that manages the client status; and the request unit embeds the client status information in the URL of the HTTP request.

Another aspect of the invention is a client with an internal web browser connected to a web server over a network, including a request unit that sends an HTTP request for acquiring data to the server; a data acquisition unit that gets HTML data supplied from the server in response to the HTTP request; and a process execution unit that executes a process based on the supplied HTML data. The request unit embeds the client status information in the URL of the HTTP request.

Another aspect of the invention is a control method for a client with an internal web browser connected to a web server over a network, including steps of: sending an HTTP request for acquiring data to the server; getting HTML data supplied from the server in response to the HTTP request; and executing a process based on the supplied HTML data; and embedding the client status information in the URL of the HTTP request.

Communication for only sending status information is not required with this aspect of the invention because the client sends its own status information embedded in the URL of the HTTP request sent to the server. As a result, communication between the client and server can be reduced. A general use server can therefore be used and building a special client-server environment is not necessary because a special server or environment are not required. A low-cost network system can therefore be assembled, and the cost of managing client status by means of a web server can be reduced.

In a network system according to another aspect of the invention, the data transmission unit embeds a check status message prompting checking the status in the HTML data; and the request unit embeds the client status information in the URL of the HTTP request based on the check status message.

Because the server sends a check status message embedded in HTML data to the client, communication from the server only to check the client status is not necessary in this embodiment of the invention. The number of client-server communication instances can therefore be reduced.

In a network system according to another aspect of the invention, when status information indicating a problem with the client is contained in the HTTP request acquired by the request receiving unit, the data transmission unit embeds the check status message in the HTML data.

This aspect of the invention enables checking the client status as needed, such as when troubleshooting a client problem is required.

In a network system according to another aspect of the invention, the check status message includes a troubleshooting program for troubleshooting a client problem.

This aspect of the invention enables troubleshooting client problems even when a troubleshooting program is not installed in the client.

In a network system according to another aspect of the invention, the data transmission unit preferably embeds the check status message in the HTML data when a specific time has passed since the last time a check status message was sent.

This aspect of the invention enables determining the client status at any time as a result of the server sending a check status message, even when a HTTP request is not received from the client.

In a network system according to another aspect of the invention, the client is preferably a printer, and the process execution unit is a print unit that executes a printing process based on the acquired HTML data.

This aspect of the invention enables using the invention to provide a printing service using a web server. In addition, because a web browser is built in to the printer, the server can communicate directly with the printer without going through a computer, and a network system can be built at even lower cost.

In a network system according to another aspect of the invention, the printer preferably has a print format storage unit that stores a print format; and the print unit reads a print format specified in the HTML data from the print format storage unit and prints.

Because this aspect of the invention stores print formats in the printer, the amount of HTML data that is communicated can be reduced because it is only necessary to include data specifying the print format in the HTML data (because the print data does not need to be included in the HTML data) sent from the server.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a network system, client, and client control method according to the present invention is described below with reference to the accompanying figures. This embodiment describes a network system having a kiosk terminal with a printing function that is installed in a convenience store, for example, with the kiosk printer connected to a server over the Internet.

Figure 1:
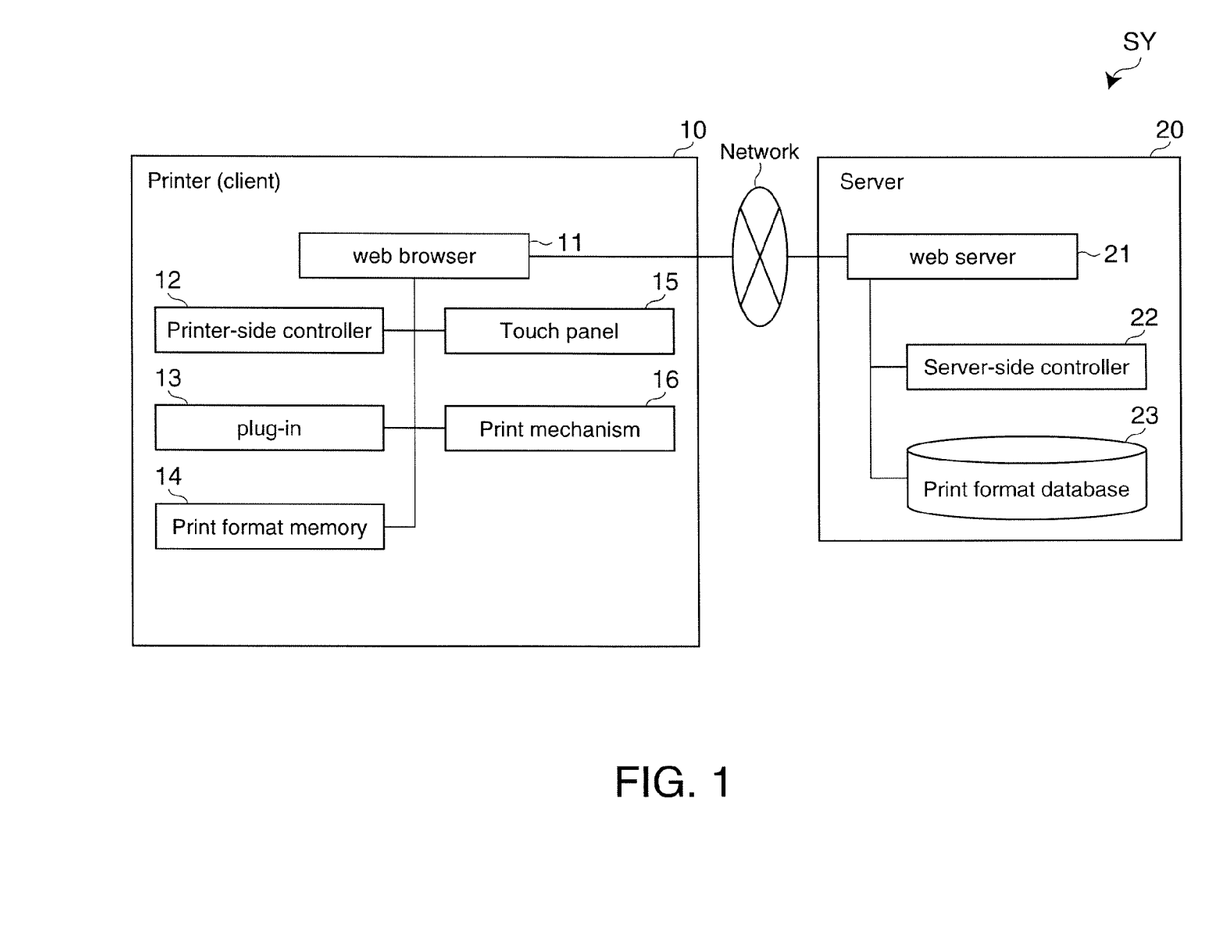
FIG. 1 is a block diagram of a network system according to a first embodiment of the invention.

FIG. 1 is a block diagram of the network system SY. As shown in the figure, an network system SY according to this embodiment of the invention has one or more printers 10 (only one shown in the figure) that function as clients, and a server 20 that centrally manages these one or more printers 10. The printers 10 and the server 20 are connected over a network (Internet) NT.

The main hardware components of the printer 10 include a web browser 11, printer-side controller 12, extension plug-in 13, print format memory 14, touch panel 15, and print mechanism 16.

The web browser 11 is a software application for displaying HTML data. The printer-side controller 12 includes a CPU (central processing unit), ROM (read-only memory), and RAM (random access memory), and controls internal printer 10 operations.

The plug-in 13 executes printing processes based HTML data from the web browser 11.

The print format memory 14 nonvolatilely stores the print format supplied from (downloaded from) the server 20.

The touch panel 15 includes a display for displaying browser content, and a touch pad for inputting information.

Figure 5:
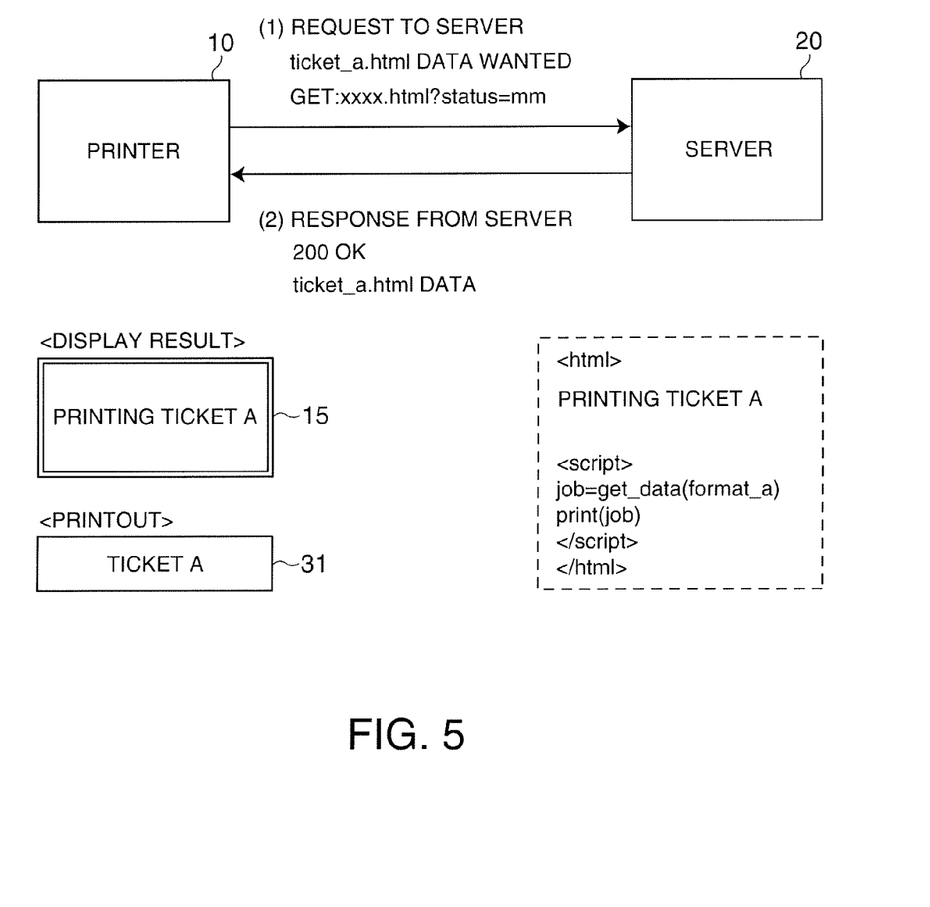
FIG. 5 describes a HTTP request containing status information.

The print mechanism 16 is a mechanism for issuing tickets and other printout 31 (see FIG. 5). The print mechanism 16 includes a paper feed mechanism, printhead, and paper cutter, for example. This embodiment of the invention anticipates using continuous receipt paper as the print medium, but rectangular cut-sheet paper may be used. Any appropriate printing method can also be used, including inkjet and laser (electrophotographic printing) methods.

The main hardware components of the server 20 include a web server 21, server-side controller 22, and print format database 23.

The web server 21 is a software application for sending HTML data to a web browser 11. The server-side controller 22 includes a CPU, ROM, and RAM, and controls internal server 20 operations.

The print format database 23 stores numerous print formats that the web server 21 serves to the printers 10.

Thus configured, the server 20 (web server 21) generates print jobs in response to HTTP requests from the connected printers 10 (web browser 11), and returns the print jobs wrapped in HTML data. When a print format is requested from a printer 10, the server 20 reads and supplies the requested print format from the print format database 23 to the printer 10. The server 20 manages printer 10 status based on the status information sent from each printer 10.

Each printer 10 sends its own status information embedded in the URL (Uniform Resource Locator) of the HTTP request sent to the web server 21. This is described in further detail below.

Figure 2:
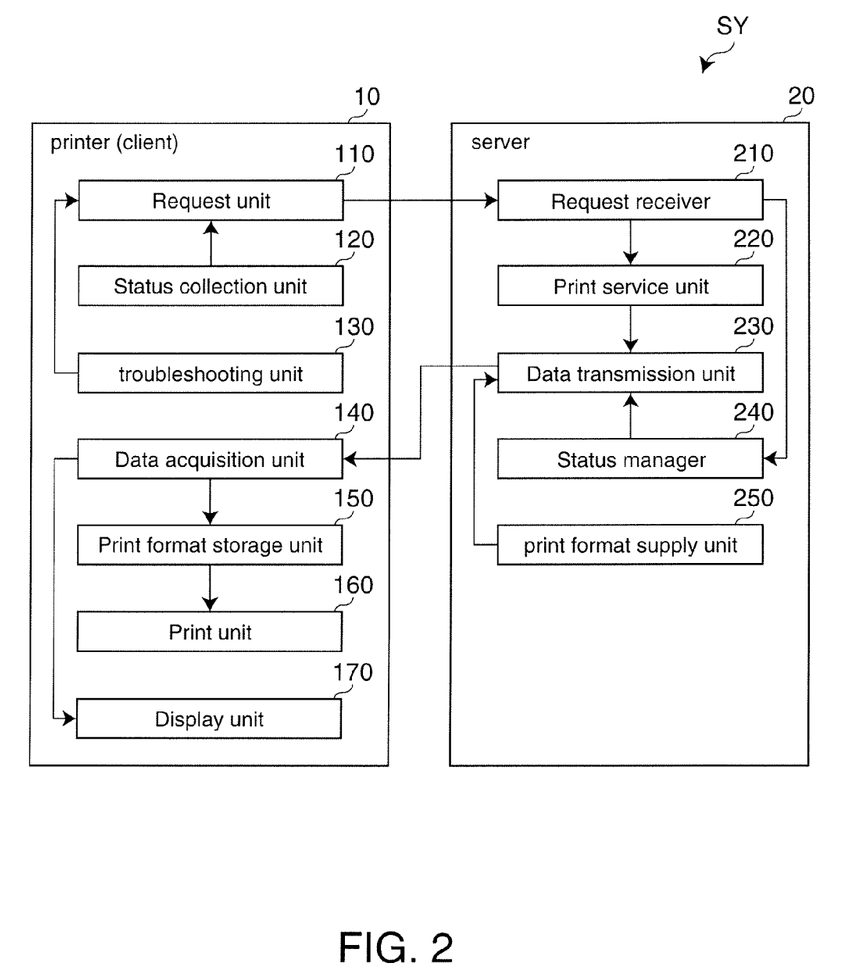
FIG. 2 is a function block diagram of the network system.

FIG. 2 is a function block diagram of the network system SY. The main functional components of the printer 10 include a request unit 110, status collection unit 120, troubleshooting unit 130, data acquisition unit 140, print format storage unit 150, print unit (process execution unit) 160, and display unit 170.

The request unit 110 sends HTTP requests for acquiring data to the server 20, and includes primarily the web browser 11 and printer-side controller 12. The request unit 110 embeds printer 10 status information in the URL of an HTTP request at specific times (when executing a specific request). When a check status message is received from the server 20 through the data acquisition unit 140 described below, the request unit 110 embeds the printer 10 status information in the URL of an HTTP request according to the check status message. The status information embedded in the URL of the HTTP request is used by the server 20 to manage printer 10 (client) status.

The status collection unit 120 collects status information about the printer 10, and is rendered primarily by the plug-in 13. The printer status information collected by the status collection unit 120 refers to the operating state of hardware and software components of the printer 10, including the touch panel 15 and print mechanism 16. When information identifying a specific hardware and/or software component is included in the check status message, the status of the specified hardware and/or software component is obtained. Examples of status information include paper jams (and where the jam occurred), no paper, printing completion (normal, failure), errors (including error codes), and number of pages printed. The status information also includes a no-ink status in the case of an inkjet printer, and a no-toner status in the case of a laser printer. The printer model, remaining ink (toner) level, print volume, location, administrator, and other MIB (Management Information Base) values are also included in the status information, and collected by the status collection unit 120.

When a troubleshooting program (check printer script, see FIG. 6A) for analyzing printer 10 problems is contained in the check status message, the troubleshooting unit 130 determines the hardware or software problem in the printer 10 according to the troubleshooting program, and is rendered primarily by the printer-side controller 12. The result from the troubleshooting unit 130 is sent to the server 20 as part of the status information by the request unit 110 (embedded in the URL of the HTTP request).

The data acquisition unit 140 gets the HTML data supplied from the server 20 in response to the HTTP request, and is rendered mainly by the web browser 11 and plug-in 13. Note that the check status message is information contained in the HTML data acquired by the data acquisition unit 140. More specifically, the server 20 (data transmission unit 230 described below) sends the check status message embedded in the HTML data sent to the printer 10.

The print format storage unit 150 stores the print format downloaded from the server 20, and is rendered mainly by the print format memory 14.

The print unit 160 is rendered primarily by the print mechanism 16, and when the target format, which is the intended print format of the printout, is stored in the print format storage unit 150, the print unit 160 prints using this target format. When the target format is not in the print format storage unit 150, the print unit 160 downloads the target format from the server 20 for printing.

The display unit 170 is rendered mainly by the touch panel 15, and displays a graphical user interface (GUI) enabling user operations.

The main functional parts of the server 20 include a request receiver 210, print service unit 220, data transmission unit 230, status manager 240, and print format supply unit 250.

The request receiver 210 receives HTTP requests from the printer 10, and is rendered primarily by the request receiver 210. As described above, status information may be embedded in the URL of the HTTP request.

The print service unit 220 supplies printing services such as generating print jobs according to the flow of the printing process.

The data transmission unit 230 sends HTML data to the printer 10, and is rendered primarily by the web server 21 and server-side controller 22. The data transmission unit 230 also outputs a check status message embedded in HTML data as required.

Note that "as required" as used herein means that status information indicating a printer 10 problem is contained in the HTTP request acquired by the request receiver 210.

The status manager 240 manages the status of client devices such as the connected printers 10 based on the status information embedded in the URL of the HTTP request acquired by the request receiver 210, and is rendered primarily by the server-side controller 22.

The print format supply unit 250 supplies the print format read from the print format database 23 to the connected printers 10, and is rendered primarily by the print format database 23.

Figure 3:
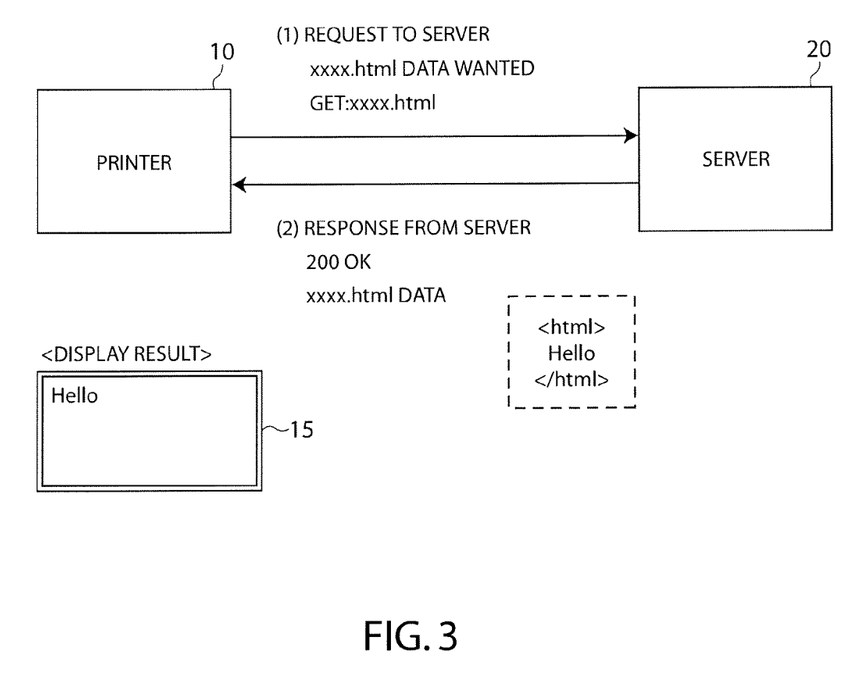
FIG. 3 describes a common HTTP request.

An example of communication between the printer 10 and server 20 is described next with reference to FIG. 3 to FIG. 6. FIG. 3 describes a common HTTP request sent by the printer 10. As shown in the figure, the printer 10 sends a GET request to the server 20 to request a particular page. In response, the server 20 returns "200 OK" (an HTTP status code indicating the request was processed normally) and HTML data to the printer 10. When the content of the HTML data is as indicated by the dotted line in the figure, the touch panel 15 of the printer 10 displays a browser page based on the HTML data. A "404 Not found" HTTP status code is returned when the printer 10 inputs the wrong URL.

Figure 4:
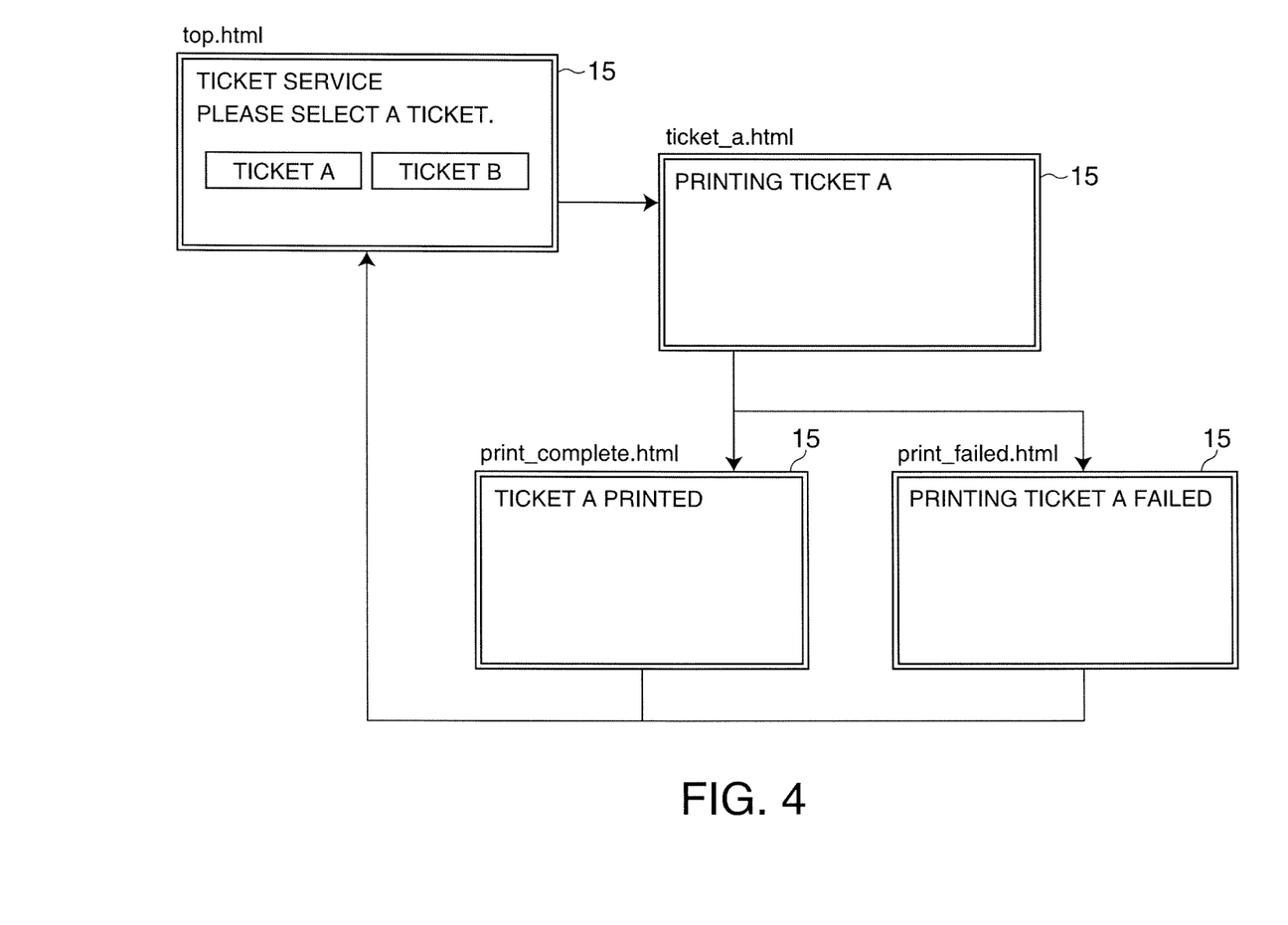
FIG. 4 is a screen transition diagram showing the printing flow of a printer.

FIG. 4 shows the screen transitions on the touch panel 15 during the printing process of the printer 10. In this embodiment of the invention a web page is sent from the server 20 according the flow of the printing process as shown in the figure. More specifically, a printing page (ticket_a.html) is displayed based on the selection made at the top page (top.html), either a printing completed page (print_complete-.HTML,) or failure report (print_failed.html) is displayed according to the result of the printing operation, and the top page (top.html) is then displayed again.

FIG. 5 describes communication between the printer 10 and server 20 when the printing page (ticket_a.html) in FIG. 4 is selected. As shown in the figure, the printer 10 sends status information embedded in the URL of the HTTP request requesting the printing page. In the example shown, the status information is "?status=mm". The server 20 returns HTML data such as shown in the dotted line in the figure in response to the HTTP request. The printer 10 displays a message such as "printing ticket A . . . " in a browser window on the touch panel 15, and produces a printout 31 using format_a according to the HTML data.

Figure 6A:
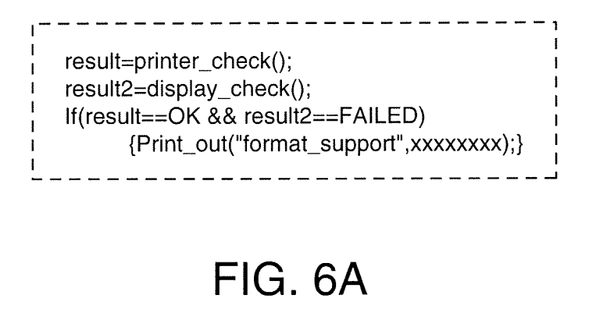
FIG. 6A shows an example of a troubleshooting program.

FIG. 6A shows an example of a check status message (troubleshooting program) that the server 20 embeds in HTML data. This example says to check the printing-related hardware and check the touch panel 15 (display), and print "xxxxxxxx" using format_support if there are no printing-related hardware problems and there is a problem with the touch panel 15.

Figure 6B:
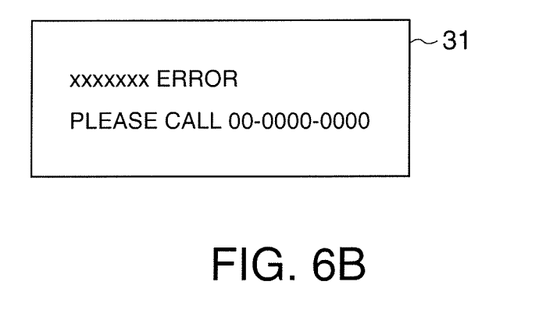
FIG. 6B shows an example of the result of the client-side process based on the error interpretation program.

FIG. 6B shows the result (that is, printout 31) of the process executed according to the check status message in FIG. 6A. As shown in the figure, a telephone number and user instructions are printed based on the print command contained in the "xxxxxxxx" part of the check status message.

Figure 7:
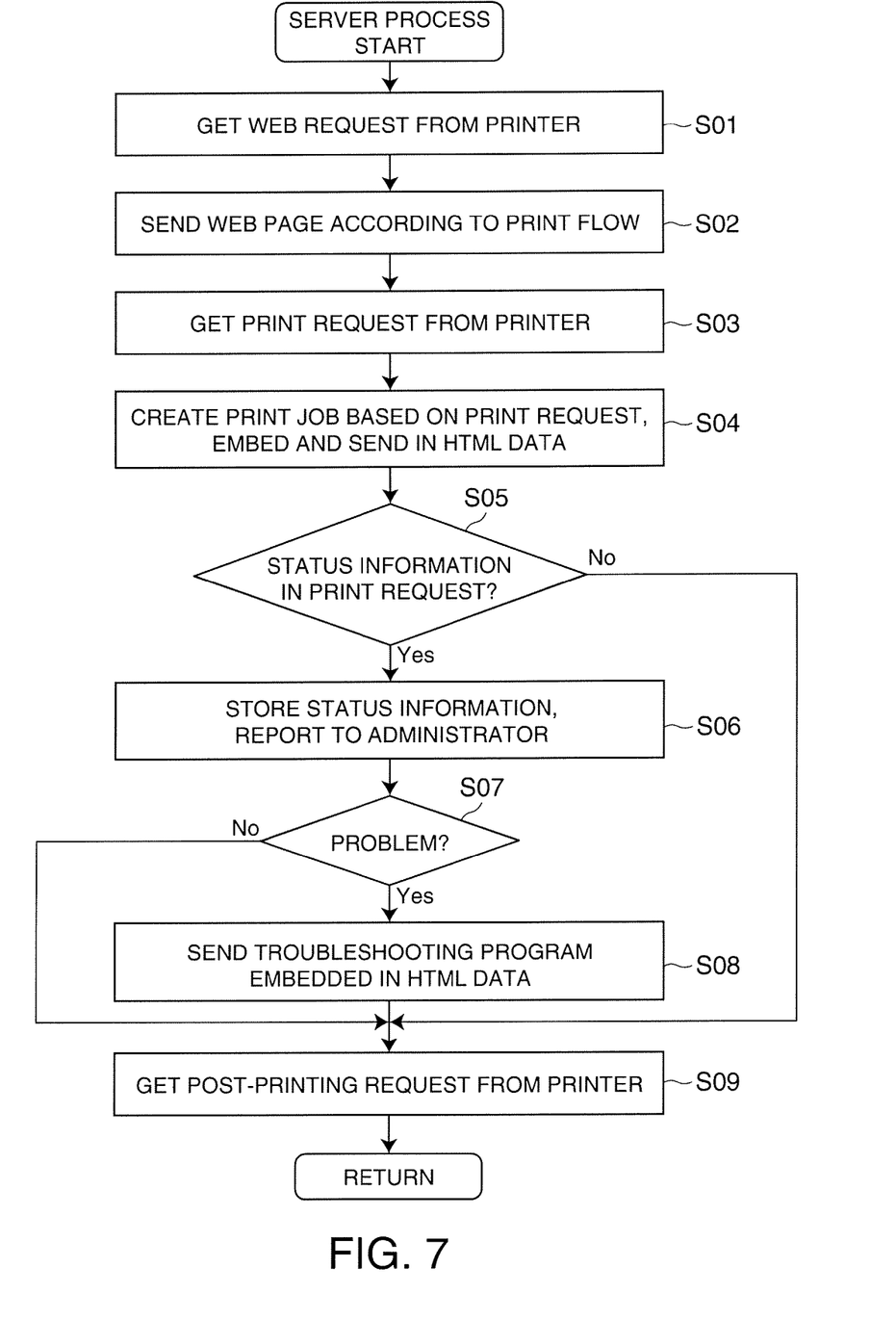
FIG. 7 is a flow chart of the server process.
Figure 8:
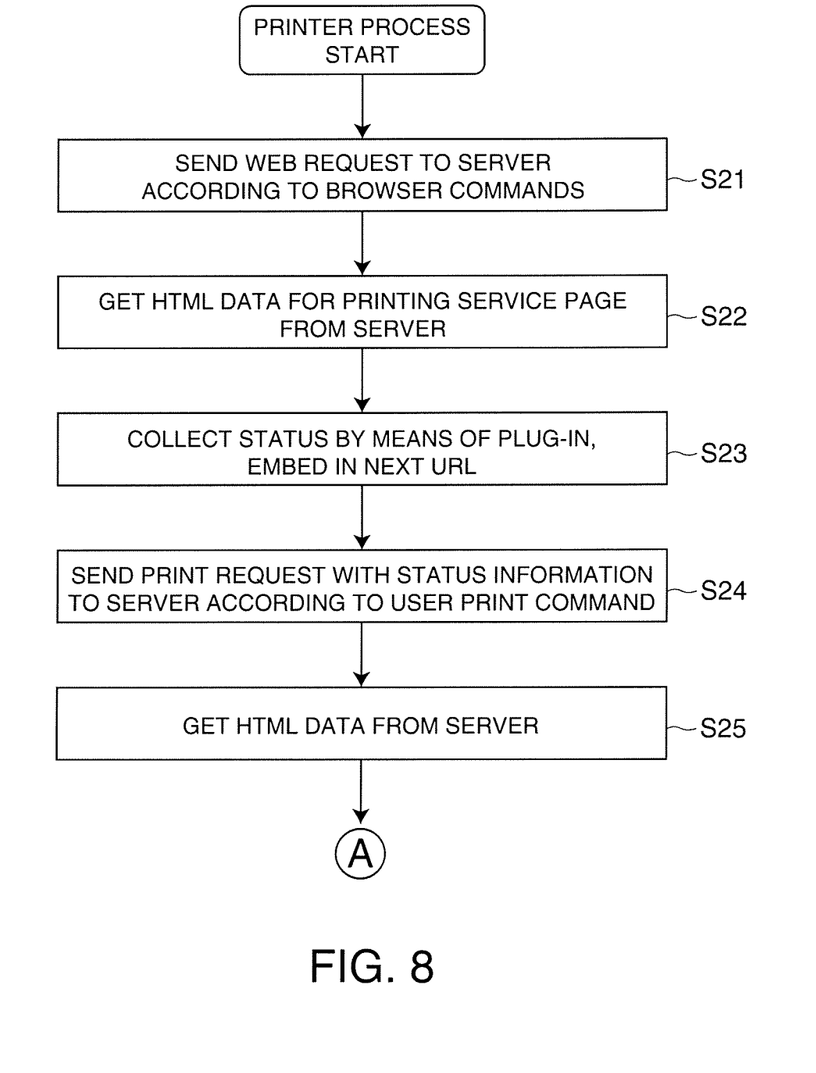
FIG. 8 is a flow chart of the printer process.

The server 20 and printer 10 processes are described next with reference to FIG. 7 to FIG. 9. FIG. 7 is a flow chart of the server 20 process. When the server 20 receives a web request (HTTP request) from the printer 10 (S01), it sends a web page according to the flow of the printing process (S02). More specifically, the server 20 sends HTML data for displaying the top page (top.html) shown in FIG. 4 to the printer 10. When a print request is then received from the printer 10 (S03), the server 20 generates a print job according to the print request, and sends the print job embedded in HTML data (S04). More specifically, when a button labelled "ticket A" or a button labelled "ticket B" is selected (clicked) on the top page (top.html) shown in FIG. 4, a print request is received from the printer 10 as shown in FIG. 5, and the server 20 returns HTML data.

The server 20 then determines if status information is contained in the print request (S05). If status information is included (S05 returns Yes), the status information is recorded in a storage device not shown, and a report is sent to the administrator according to the content of the status information (S06). A report could be sent by displaying a message on a display device (not shown in the figure) connected to the 200, by e-mail, or other communication means, for example.

If status information is not included in S05 (S05 returns No), steps S06 to S08 are omitted.

If status information is contained in the print request, whether the status information indicates a problem is determined (S07). If there is a problem (S07 returns Yes), the troubleshooting program (check status message, see FIG. 6A)

is embedded in HTML data and sent to the printer 10 (S08). If the status information does not indicate a problem (S07 returns No), step S08 is skipped. A post-printing request is then received from the printer 10 (S09). A post-printing request refers to accessing an end-of-printing page (print_complete.html or print_failed.html). Although not shown specifically in the flow chart, if status information is contained in the post-printing request, operation repeats from step S05.

The printer 10 process is described next referring to FIG. 8 and FIG. 9.

The printer 10 sends a web request to the server 20 as a result of user manipulation of the browser on the touch panel 15 (S21). As a result, the printer 10 receives HTML data for the printing service page (top page) from the server 20 (S22). The printer 10 collects and embeds printer status information by means of the plug-in 13 in the next URL (S23). The printer 10 also sends a print request with status information (HTTP request with status information embedded in the URL) to the server 20 based on the user's print command (selection of the ticket A or ticket B button on the top page) (S24).

Figure 9:
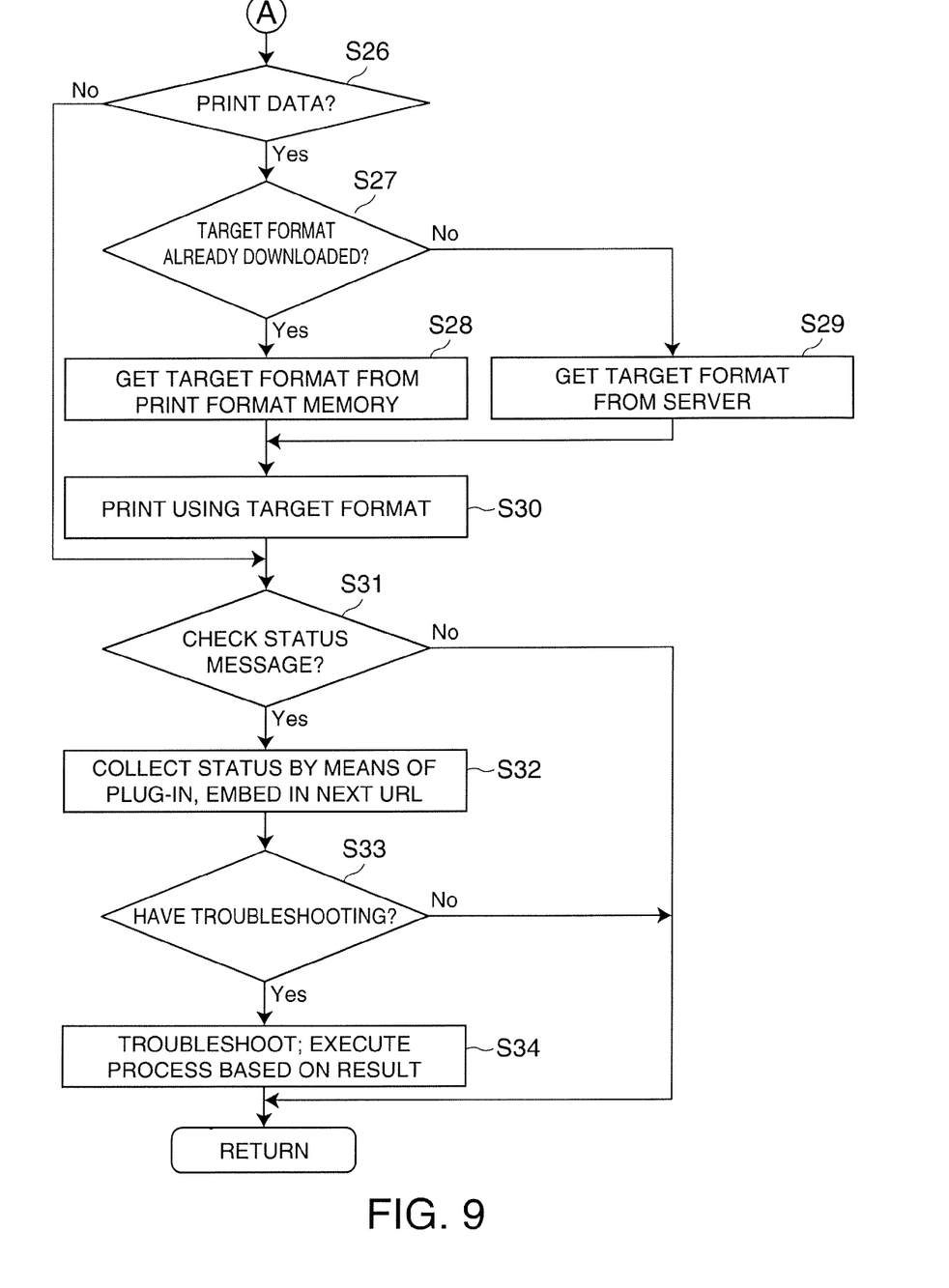
FIG. 9 continues the flow chart of the printer process shown in FIG. 8.

When the printer 10 receives HTML data from the server 20 (S25), the plug-in 13 determines if print data is included in the HTML data (S26 in FIG. 9). If print data is included (S26 returns Yes), the printer 10 determines if the target format used for printing has already been downloaded (is stored in the print format memory 14) (S27). If the print format was already downloaded (S27 returns Yes), the printer 10 reads the target format from print format memory 14 (S28) and prints using the target format (S30). If the target format has not been downloaded (S27 returns No), the printer 10 requests and acquires the target format from the server 20 (S29), and prints (S30). If print data is not contained in the acquired HTML data (S26 returns No), steps S27 to S30 are skipped.

The printer 10 then determines if a check status message is embedded in the acquired HTML data (S31), and if a check status message is embedded (S31 returns Yes), the plug-in 13 collects and embeds the status information in the next URL (S32). The printer 10 then determines if a troubleshooting program is included in the check status message (S33), and if it is (S33 returns Yes), determines the printer 10 problem and executes a process based on the result (S34). "Executing a process based on the result" as used herein means producing printout 31 such as shown in FIG. 6B or displaying a message on the touch panel 15. Note that steps S32 to S34 are skipped if step S31 returns No, and step S34 is skipped if S33 returns No.

As described above, the printer 10 embeds its status information in the URL of an HTTP request sent to the server 20 in the network system SY according to this embodiment of the invention, and therefore does not need to separately communicate only the printer status. This reduces traffic between the client and server. In addition, because a special server or environment is not required, the network system SY can be built inexpensively and the cost of managing printer 10 (client) status information by means of a server can therefore be reduced.

Furthermore, because the server 20 sends a check status message embedded in the HTML data for the printing service, the server 20 does not need to communicate with the printer 10 simply to check the device status. Communication between the client and server can therefore be reduced. In addition, because the server 20 embeds a check status message when status information indicating a problem is contained in the acquired HTTP request, the server 20 can check the device status when needed. Yet further, by including a troubleshooting program in the check status message, troubleshooting is possible even when a troubleshooting program is not installed in the printer 10.

Furthermore, because the printer 10 according to this embodiment of the invention has a built-in web browser 11, the server 20 can communicate directly with the printer 10 without going through a computer or other device, and the network system SY can be constructed at an even lower cost.

Because the printer 10 stores print formats inside the printer 10, data specifying a print format can be simply included in the HTML data sent from the server 20, and the amount of HTML data can therefore be reduced.

Figure 10A:
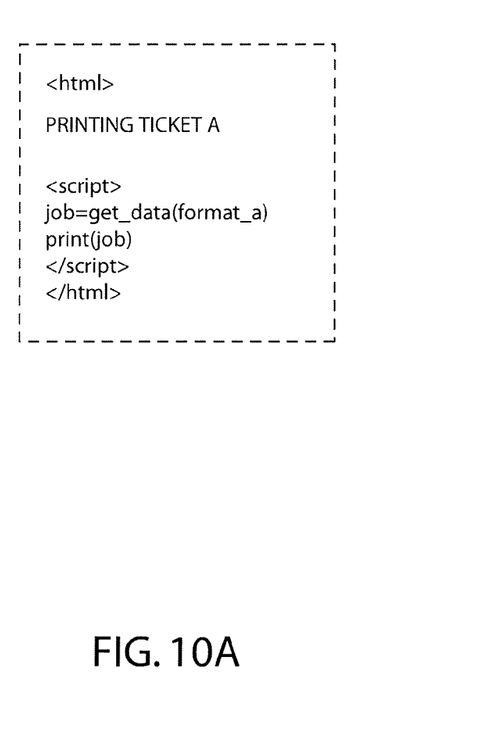
FIGS. 10A and 10B show a variation of HTML data.
Figure 10B:
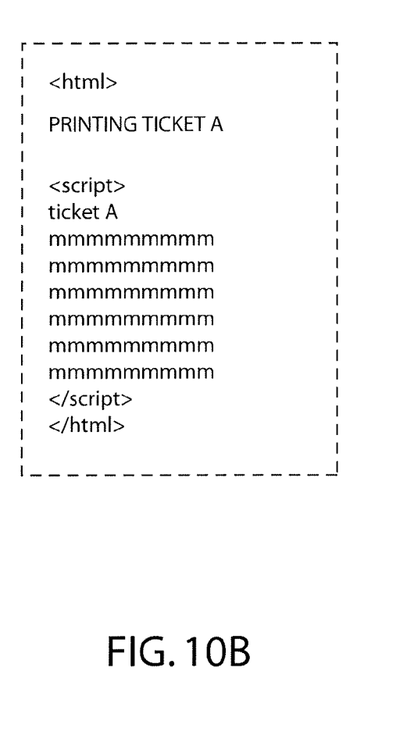

The server 20 in the embodiment described above sends data (such as "format_a") specifying the print format in the HTML data related to printing as shown in FIG. 5 and FIG. 10A, but HTML data that does not specify the format could be sent as shown in FIG. 10B. More specifically, the server 20 could send HTML data that has all of the print data embedded in the "mmmmmmm . . . " part shown in the figure.

This embodiment of the invention prints "ticket A" or "ticket B" using a print format as described above, but could print by substituting or inserting a user-specified image or other specific image.

Figure 11:
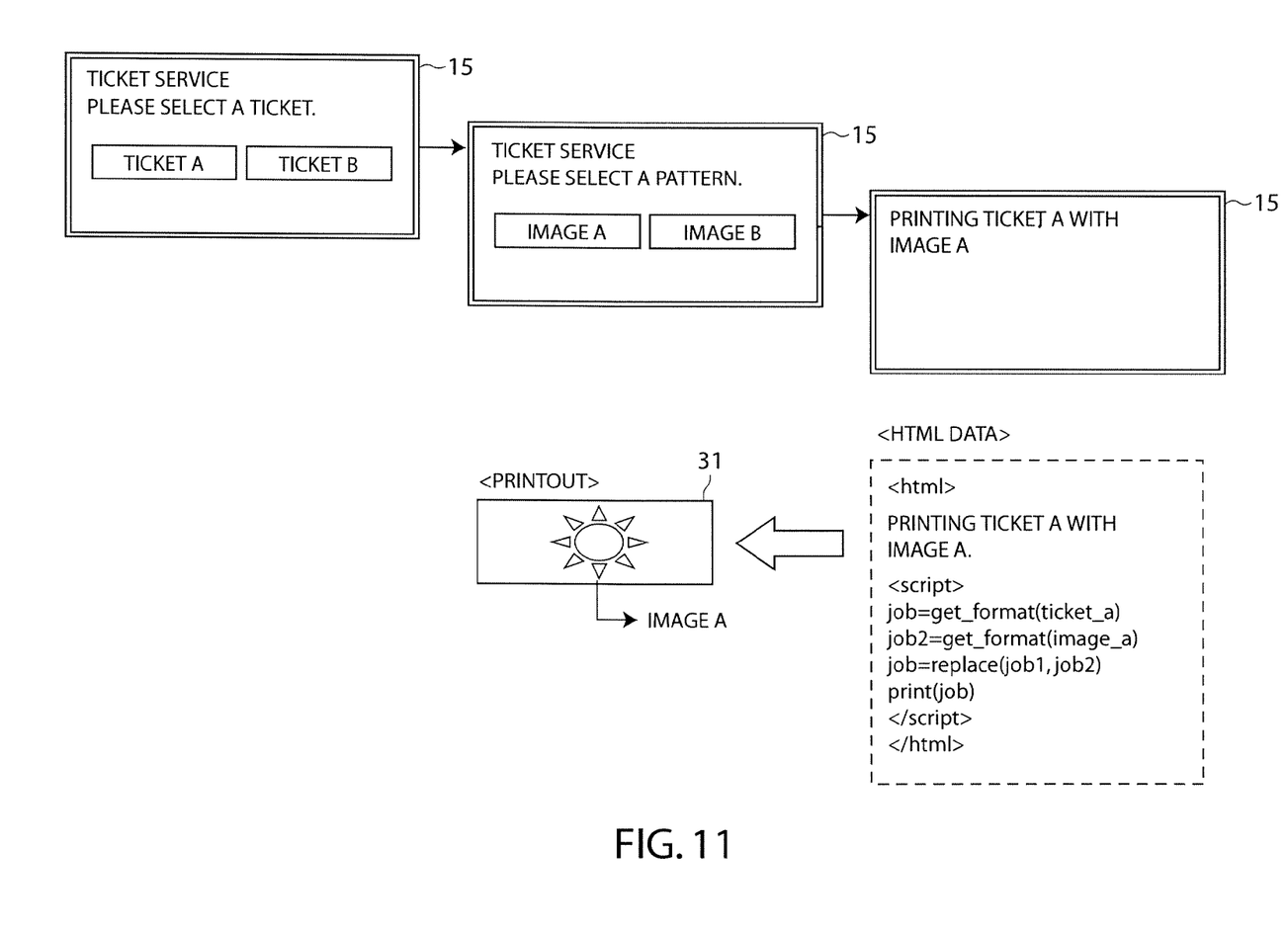
FIG. 11 shows a variation of the printing method and HTML data.

FIG. 11 illustrates this substitution process. The user selects a ticket on the first screen, and then selects the pattern (image) to be inserted. As a result, printout 31 using the format corresponding to the selected ticket and the selected image can be produced. A script such as shown in the dotted line in the figure is an example of HTML data sent from the server 20 in this case.

A barcode reader, magnetic card reader, or other input device could be connected to the printer 10 side, and input data from the input device could be inserted to the print format specified by the server 20 and printed. A real-time clock (RTC) could also be incorporated in the printer 10, and date or time information kept by the RTC could be inserted to the print format and printed. In this case a previously rendered format is preferably stored as the print format. More specifically, a previously rendered format is preferably supplied from the server 20 (print format supply unit 250).

A "previously rendered format" as used herein means a format converted to the specific printing method of the printer 10, or more specifically a format including control codes corresponding to the manufacturer and model of the printer 10. By storing the print format in a previously rendered form, the time required for the printing process can be significantly shortened because a rendering process is not needed when the printer 10 executes the printing process.

The printer 10 (request unit 110) embeds its own status information in the URL of the HTTP request at specific times in the embodiment described above, but the status information collected by the status collection unit 120 could always be embedded in the URL when an HTTP request is sent. Further alternatively, status information could be embedded and sent in the URL of the HTTP request only when a check status message is acquired from the server 20 instead of the printer 10 sending the status information automatically.

Further alternatively, the printer 10 (client) could monitor a specific condition, and send status information only when the condition is satisfied (or not satisfied). For example, a clock could be incorporated in the printer 10, and status information could be embedded and sent in the URL of the HTTP request sent next when a specified time has passed since the last time status information was sent.

Alternatively, the server 20 could count a specified time. In this case, the server 20 (data transmission unit 230) sends a check status message embedded in HTML data when a specified time has passed since the last time a check status message was sent. This configuration enables the server 20 to send a check status message to the printer 10 and thereby always know the printer 10 status even when an HTTP request is not received from the printer 10.

Components of the network system SY (printer 10, server 20) described above can also be provided as a computer-executable program. The program can also be provided stored on a recording medium such as CD-ROM, flash memory, or other storage medium.

A network system SY that is used in a convenience store is described by way of example above, but can obviously also be used in environments other than convenience stores and other retail stores.

A printer 10 is also used as an example of a client above, but the invention can also be applied to network systems including electronic devices other than printers 10 (such as display devices, playback devices, and communication devices). In other words, the invention can be used with any type of client that is used in an environment requiring status management by means of a network-connected server.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A network system having a web server and a client with an internal web browser connected over a network, wherein:
   a request unit of the client sends HTTP request for acquiring a printing service page to a request receiving unit of the server;
   a data acquisition unit of the client receives HTML data for the printing service page from a data transmission unit of the server in response to the HTTP request;
   after the HTML data for the printing service page is received, the request unit embeds client status information in the URL of the HTTP print request for acquiring print data and sends the HTTP print request to the request receiving unit of the server;
   the data acquisition unit receives HTML print data from the transmission unit in response to the HTTP print request;
   a process execution unit of the client executes a printing process based on the received HTML print data;
   when the HTML print data includes a check status message, the request unit embeds client status information in the next URL sent to the server; and
   a status management unit of the server manages a client status of the client based on the client status information.

2. The network system described in claim 1, wherein:
   when status information indicating a problem with the client is contained in the client status information, the data transmission unit embeds the check status message in the HTML print data.

3. The network system described in claim 2, wherein:
   the check status message includes a troubleshooting program for troubleshooting a client problem.

4. The network system described in claim 1, wherein:
   the data transmission unit embeds the check status message in the HTML print data when a specific time has passed since the last time a check status message was sent.

5. The network system described in claim 1, wherein:
   the client is a printer; and
   the process execution unit is a print unit that executes the printing process based on the received HTML print data.

6. The network system described in claim 5, wherein:
   the printer has a print format storage unit that stores a print format; and
   the print unit reads a print format specified in the HTML print data from the print format storage unit and prints using the print format read from the print format storage unit.

7. A client with an internal web browser connected to a web server over a network, comprising:
   a request unit, a data acquisition unit, and a process execution unit, whrein:
   the request unit sends an HTTP request for acquiring a printing service page to the server;
   the data acquisition unit receives HTML data for the printing, service page from the server in response to the HTTP request;
   after the HTML data for the printing service page is received, the request unit embeds client status information in the URL of an HTTP print request for acquiring print data and sends the HTTP print request to the server;
   the data acquisition unit receives HTML print data from the server in response to the HTTP print request;
   the process execution unit executes a printing process on the received HTML print data; and
   when the HTML print data includes a check status message, the request unit embeds client status information in the next URL, sent to the server.

8. The client described in claim 7, wherein:
   the check status message includes a troubleshooting program for troubleshooting a client problem.

9. The client described in claim 7, wherein:
   the client is a printer; and
   the process execution unit is a print unit that executes the printing process based on the received HTML print data.

10. The client described in claim 9, wherein:
    the printer has a print format storage unit that stores a print format; and
    the print unit reads a print format specified in the HTML print data from the print format storage unit and prints using the print format read from the print format storage unit.

11. A control method for a client with an internal web browser connected to a web server over a network, comprising steps of:
    sending an HTTP request for acquiring a printing service page to the server:
    receiving HTML data for the printing service page from the server in response to the HTTP request:
    after the HTML data for the printing service page is received, embedding client status information in the URL of an HTTP print request for acquiring print data and sending the HTTP print request to the server:
    receiving HTML from the server in response to the HTTP print quest;
    executing a printing process based on the received HTML print data; and
    when the HTML print data includes a check status message, embedding client status information in the next URL sent to the server.

12. The client control method described in claim 11, wherein:
    the check status message includes a troubleshooting program for troubleshooting a client problem.

13. The client control method described in claim 11, wherein:
   the client is a printer; and
   the control method also has a step of executing the printing process based on the received HTML print data.

14. The client control method described in claim 13, further comprising a step of:
   storing a print format in a storage unit; and
   reading a print format specified in the HTML print data from the storage unit and printing using the print format read from the storage unit.

* * * * *